United States Patent
Pahwa et al.

(10) Patent No.: US 9,129,428 B2
(45) Date of Patent: Sep. 8, 2015

(54) MAP TILE SELECTION IN 3D

(71) Applicant: Apple Inc., Cupertino, CA (US)

(72) Inventors: Aroon Pahwa, Cupertino, CA (US);
Edward Kandrot, San Jose, CA (US);
Christopher Blumenberg, Cupertino, CA (US); Jeffrey H. Hultquist, Cupertino, CA (US); Robert R. Cook, San Francisco, CA (US); Billy P. Chen, Cupertino, CA (US); Patrick S. Piemonte, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 310 days.

(21) Appl. No.: 13/706,243

(22) Filed: Dec. 5, 2012

(65) Prior Publication Data
US 2013/0321411 A1     Dec. 5, 2013

Related U.S. Application Data

(60) Provisional application No. 61/653,909, filed on May 31, 2012.

(51) Int. Cl.
| | |
|---|---|
| *G06T 17/00* | (2006.01) |
| *G06T 15/00* | (2011.01) |
| *G06T 15/20* | (2011.01) |
| *G06T 17/05* | (2011.01) |

(52) U.S. Cl.
CPC ............. *G06T 15/005* (2013.01); *G06T 15/20* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 8,004,522 B1 | 8/2011 | Toksvig et al. | |
| 2008/0079719 A1 | 4/2008 | Woo | |
| 2010/0085350 A1* | 4/2010 | Mishra et al. | 345/419 |
| 2012/0274633 A1* | 11/2012 | Ivanov et al. | 345/419 |
| 2013/0093750 A1* | 4/2013 | Cornell et al. | 345/419 |
| 2013/0202197 A1* | 8/2013 | Reeler et al. | 382/154 |
| 2013/0300740 A1* | 11/2013 | Snyder et al. | 345/420 |
| 2013/0325481 A1* | 12/2013 | van Os et al. | 704/275 |
| 2013/0342537 A1* | 12/2013 | Vorhies | 345/428 |

FOREIGN PATENT DOCUMENTS

WO      2013101167 A1    7/2013

* cited by examiner

*Primary Examiner* — Phi Hoang
*Assistant Examiner* — Mohammad H Akhavannik
(74) *Attorney, Agent, or Firm* — Kilpatrick Townsend & Stockton LLP

(57) ABSTRACT

Methods and systems are provided for efficiently identifying map tiles of a raised-relief map to retrieve from a server. An electronic device can use estimates of height(s) for various region(s) of the map to determine map tiles that are likely viewable from a given position of a virtual camera. The device can calculate the intersection of the field of view of the virtual camera with the estimated heights to determine a location of the map tiles (e.g., as determined by a 2D grid) needed. In this manner, the electronic device can retrieve, from a map server, the map tiles needed to display the image, without retrieving extraneous tiles that are not needed. Identifying such tiles can reduce the amount of data to be sent across a network and reduce the number of requests for tiles, since the correct tiles can be obtained with the first request.

22 Claims, 8 Drawing Sheets

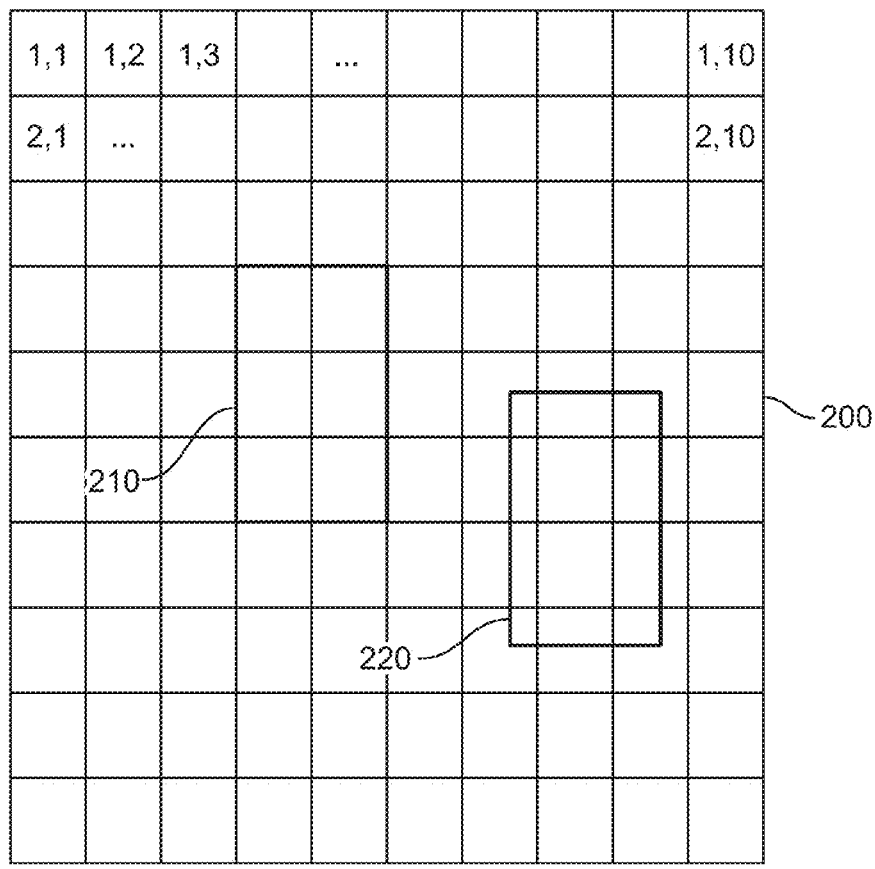
FIG. 2A
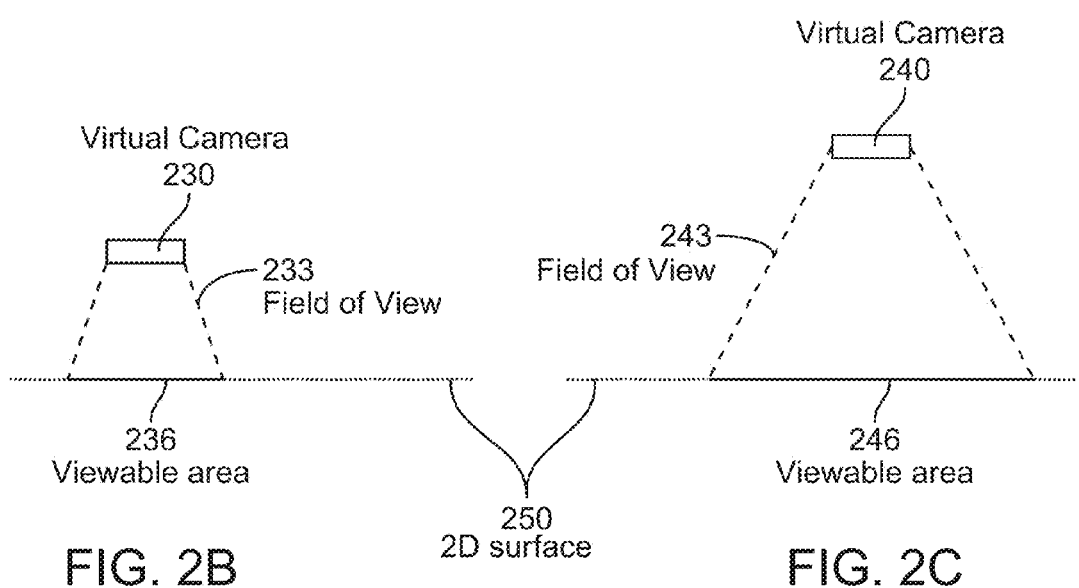
FIG. 2B
FIG. 2C

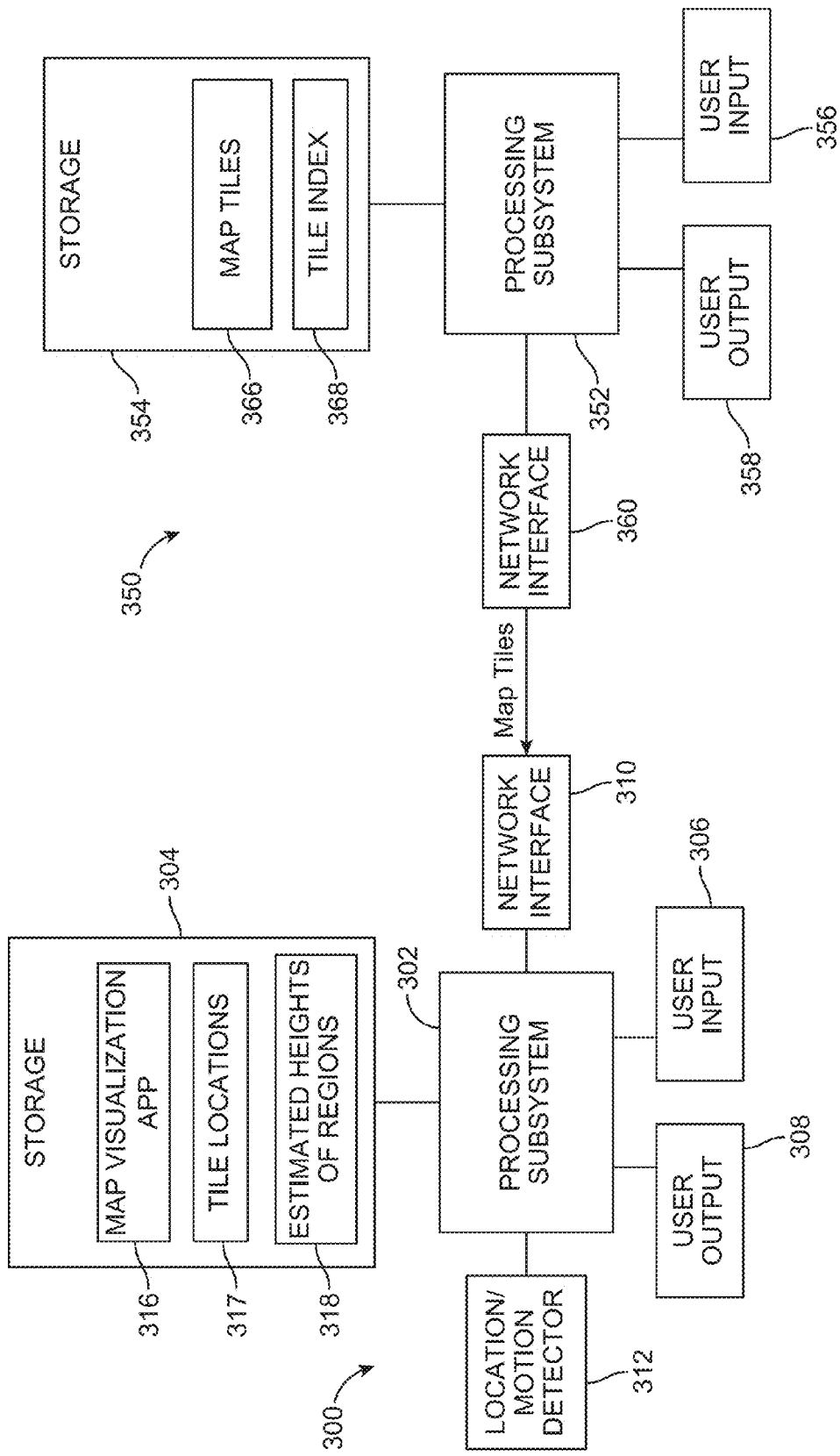

MAP TILE SELECTION IN 3D

CROSS-REFERENCES TO RELATED APPLICATIONS

The present application claims priority from and is a non-provisional application of U.S. Provisional Application No. 61/653,909 entitled "MAP TILE SELECTION IN 3D" filed May 31, 2012, the entire contents of which are herein incorporated by reference for all purposes.

BACKGROUND

The present disclosure relates generally to displaying three-dimensional (3D) views, and more specifically to determining which parts of a 3D map to retrieve from a server based on a current position of a virtual camera that provides the view of the 3D map.

Whether part of a video game or viewing a geographic map of the real world, it is useful for a user to control a view being displayed on a screen (e.g., via a touch screen or buttons). This visualization of a map allows a user to look at a map of a particular city, neighborhood, part of a national park, a mountain range, or a map of a virtual world, which can include interiors as well. To render the view of a map, a virtual position of the eye of the user (also called a virtual camera herein) is used to determine which part of the map is displayed.

Typically, a map is defined as a set of tiles. For a computer to display the desired view, a processor needs the viewable tiles for a particular position of the virtual camera, and then the processor can render an image. The computer thus needs to determine which tiles of the map are needed to display the image.

When the map is flat (e.g. just a relief map with contour lines), the part of the map that needs to be displayed can be determined relatively easily. However, when the map is a 3D map (a raised-relief map) issues arise since what is being viewed affects what the camera can see. Thus, one cannot definitely determine exactly what can be seen until the actual map is obtained.

A typical method retrieves any of the map tiles within a large perimeter around the virtual camera, e.g., everything forward from the camera to a maximum possible distance that might be seen. Such a method is fine when local storage is very large or when the bandwidth to retrieve tiles from storage is high so that the tiles can be retrieved very quickly with little cost. However, for devices with a relatively small amount of memory and limited bandwidth (e.g. a mobile device), such a technique is prohibitive.

Therefore, it is desirable to provide methods and systems for displaying an image of a raised-relief map that is suitable for devices with limited memory and network bandwidth.

BRIEF SUMMARY

Embodiments of the present invention can provide efficient methods and systems for identifying tiles of a raised-relief map to retrieve from a server. An electronic device can use estimates of a height for various regions of the map to determine tiles that are likely viewable from a given setting (i.e., a particular position of a virtual camera). In this manner, the electronic device can retrieve, from a server (which stores the tiles), the tiles needed to display the image, without retrieving extraneous tiles that are not needed. Identifying such tiles can reduce the amount of data to be sent across a network and reduce the number of requests for tiles, since the correct tiles can be obtained with the first request.

According to one embodiment, a method of displaying three-dimensional (3D) views of a raised-relief map positioned on a two-dimensional (2D) surface is provided. The electronic device receives a selection of an area on the two-dimensional surface of the raised-relief map, e.g., via a user input. An estimated height of the raised-relief map for one or more regions within the selected area is retrieved from a storage of the electronic device. A position of a virtual camera relative to the 2D surface at the selected area is identified. A field of view from the virtual camera is determined. A processor of the electronic device calculates an intersection of the field of view with the one or more estimated heights of the one or more regions within the selected area. The intersection of the field of view with the one or more estimated heights is then used to identify map tiles of the raised-relief map for rendering a 3D image of the raised-relief map corresponding to the position of the virtual camera. The identified map tiles are requested and received from a map server via a network. The received map tiles are used to display the 3D image of the raised-relief map corresponding to the position of the virtual camera.

Other embodiments are directed to systems and computer readable media associated with methods described herein.

A better understanding of the nature and advantages of the present invention may be gained with reference to the following detailed description and the accompanying drawings.

BRIEF DESCRIPTION OF THE DRAWINGS

FIG. 2A shows top view of a 2D array 200 corresponding to map tiles of a map. FIG. 2B shows a side view of a virtual camera 230 at a first height above the 2D surface 250, which contains the grid for indexing the map tiles. FIG. 2C shows a virtual camera 240 at a second larger height from 2D surface 250.

FIG. 3A is a simplified block diagram of an implementation of a device 300 according to an embodiment of the present invention. FIG. 3B is a simplified block diagram of an implementation of map server 350 according to an embodiment of the present invention.

DEFINITIONS

Figure 1:
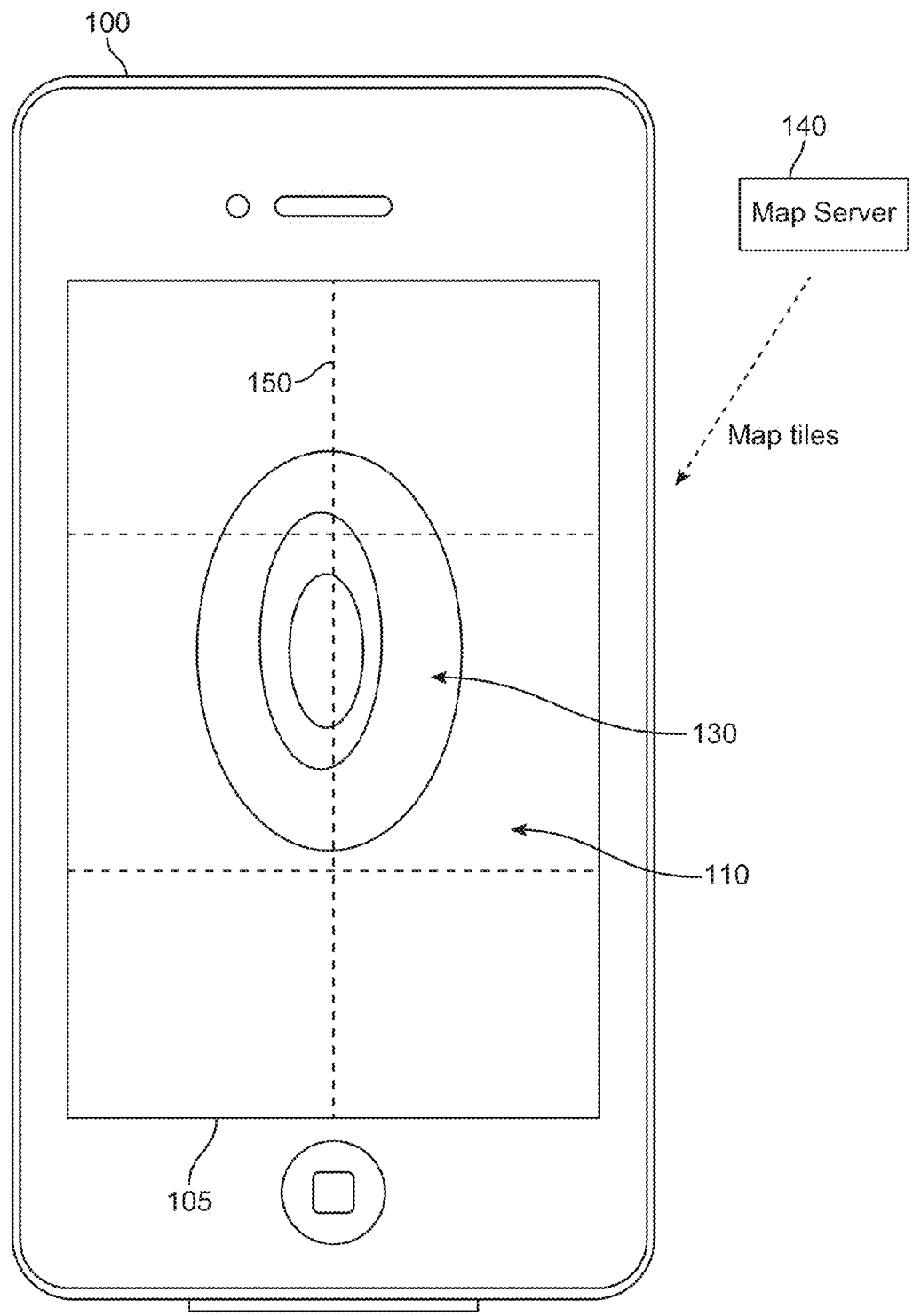
FIG. 1 shows an electronic device 100 (e.g., a smartphone) that shows an aerial view 110 of a map on a screen 105 of the electronic device.

A relief map comprises a 2D surface with markings The 2D surface is indexed to identify different parts of the map (e.g., by row and column). A raised-relief map is a 3D map. The coordinate system of the 3D map is defined by a 2D surface on which the raised-relief map is positioned. The 2D surface can be broken into indexed grid sections (or tiles) that identify a particular part of the 3D map. The third coordinate of height Z is defined relative to the 2D surface (e.g., a plane with Z=0). The height information can be stored in a map tile that corresponds to a particular section of the 2D grid. Thus, a map tile can store the variable height information for a particular grid section, e.g., the height at each X,Y coordinate within the corresponding grid section. The term "tile" can refer to both the grid section and the map information (map tile) for a particular grid section.

A 3D image is an image that shows an object along three-dimensions. The 3D image may be stereoscopic or may be a standard 2D rendering of a 3D object. A virtual camera is a location from which an image is rendered, e.g., where a lens of a camera would be to provide that image, or where a naked eye of a person would be. A field of view (also called a view volume) is the volume that is likely to be seen from the virtual camera. An intersection of the field of view with objects can provide a viewable image.

DETAILED DESCRIPTION

When rendering an image of a particular view three-dimensional map (e.g. of a virtual world or a geographic map from satellite data), a device will typically request all or almost all of the map tiles that might be viewable from a position of a virtual camera, which defines the view. Such indiscriminate retrieval of map tiles from a server wastes storage on the device and uses unnecessary bandwidth. Embodiments can more accurately determine the necessary tiles to display a particular view, thereby reducing the number of requests needed. Fewer tiles can also be requested. Both results can reduce the storage used on the device and the bandwidth used to retrieve the tiles.

A description of displaying different views of a two-dimensional (2D) map is first presented, along with the identification of the map tiles needed for displaying a selected view. A device and server diagram shows basic aspects of the computer systems and the transfer of map tiles. Then, a structure of a three-dimensional (3D) map, also called a raised-relief map, is provided. Problems with identifying the viewable map tiles for a raised-relief map is then discussed. Embodiments are then described for solving such problems, e.g., by using an estimated height.

I. Visualizing 2D Relief Maps

A typical 2D relief map might show where lakes and coastline are relative to land. A map might show where buildings or a hill are, but one would not know the elevation. And, each of the buildings and hills would be displayed in a same flat fashion. Maps can show height information in various ways. For example, contour lines may show the elevation of the ground in a map, or height values could be placed on buildings. But, the display still shows the objects in a same 2D plane. Using a 2D map makes displaying different parts of the map easy as the view is typically from directly above and all of the objects are displayed at the same height.

FIG. 1 shows an electronic device 100 (e.g., a smartphone) that shows an aerial view 110 of a map on a screen 105 of the electronic device. Specifically, screen 105 shows contours 130 signifying a mountain or hill that is higher than other areas on the map. The user may have navigated to view 110 by typing a location into a search box (e.g., Mount Diablo) on device 100, which may store the location in memory or retrieve the location from map server 140. If a user wants to view the local surroundings of where the user is currently at, the location may be a determined by a location signal, e.g., using the global positioning system (GPS) or using a known location of a Wi-Fi access point, or other similar techniques. The size of the map that is displayed on screen 105 (e.g., number of square miles) can be set by default, or input in any suitable manner. Either way, an initial set of tiles for an initial view can be provided to device 100 from map server 140.

When the user changes the view (e.g., by swiping on a touch screen), device 100 determines the new tiles needed to display the new view. Device can then request the new tiles from map server 140. The part of the map that is shown can be determined by a virtual camera, whose viewing range can determine what is shown in the display. The user can move the virtual camera around (e.g., by swiping on a touch screen), thereby changing which part of the map is shown. Device 100 can determine the tiles needed by using grid 150, which is described with regards to FIG. 2.

FIG. 2A shows top view of a 2D array 200 corresponding to map tiles of a map. As shown, the map tiles are indexed by row and column, but other indexing (e.g., by sequential numbers) can be used. One position of the viewing area on an electronic device (e.g. device 100) is shown as box 210. Bounding box 210 can be moved around to see different parts of the map. For example, a user can move the box in directions using a keypad, touch screen, or other suitable controls. As another example, the user could enter a search term (e.g., Denver) and the map can position the box over Denver with a default settings.

The device can store the indexed array 200 so that the device can identify which tiles are needed from a server. For example, at position 210, the device needs the map tiles (i.e. the graphic information of the map) corresponding to grid sections (4,4),(4,5), (5,4),(5,5), (6,4), and (6,5). Once the device identifies these grid sections, the device can request the corresponding map tiles from a server. As another example, if the user moves the view to a position of bounding box 220, the device would need grid sections (5,7),(5,8),(5,9),(6,7),(6,8),(6,9),(7,7), (7,8),(7,9),(8,7),(8,8), and (8,9). Note that more map tiles are needed as bounding box 210 does not align with the grid sections.

The grid section and tiles can be of any suitable shape. As with bounding box 220, only part of a tile may be displayed. Thus, any tile that is at least partially within the viewable area would be retrieved. The grid can be defined by a latitude and longitude for the boxes.

Generally, a bounding box (i.e. the size of the view) can be made larger or smaller, where there can be less resolution when the box is bigger. In one embodiment, when the map is made larger or smaller, a resolution setting is determined, and the device can then request the indices of a map at that particular resolution. It is also possible that different maps may be used at different resolutions. For example, different resolutions would have different sets of map tiles As examples, the server can determine which map tiles to provide based on a submitted resolution or the size of the box. The resolution can be determined by how far away a virtual camera is from a surface that defines the 2D map.

FIG. 2B shows a side view of a virtual camera 230 at a first height above the 2D surface 250, which contains the grid for indexing the map tiles. A shown, virtual camera 230 is viewing the map from directly above. At the first height, virtual camera 230 has a field of view 233 that intersects 2D surface 250 to define the viewable area 236 of the map given the position of virtual camera 230. Field of view 233 is shown as two lines where the viewable area is within the two lines. The field of view can be defined in various ways, e.g., the perimeter of an expanding circle, or other geometric shape. The viewable area 236 can be of a different shape than the screen on which the image is displayed. The device can identify the parts of the viewable area that fall within the screen size, and just request those tiles.

FIG. 2C shows a virtual camera 240 at a second larger height from 2D surface 250. Since virtual camera 240 is farther away from 2D surface 250, a field of view 243 does not intersect 2D surface 246 until later. Thus, viewable area 246 is larger. A user might select this position of virtual camera 240 by zooming out.

Although the above discussion was provided for views where the virtual camera is looking straight down at the 2D map, similar techniques may be used when the virtual camera is tilted to look along a map at an angle. For a 2D map, such view would typically not be very useful. However, when the map is a 3D map, which shows different heights of objects as a raised-relief map, such views are quite useful. For example, it may be desirable for a device to simulate a view from a helicopter to provide a virtual flight around the Grand Canyon. In such a situation, one would want to look all around the helicopter, and not just straight down. However, determining which map tiles to retrieve from a server based on the position of the virtual camera has difficulties when viewing a 3D map. Embodiments use an estimated height of one or more regions of a map to help determine which map tiles fall within the viewable area of the field of view of the virtual camera. Before discussing such issues and solutions in detail, a block diagram of an electronic device and server are described.

II. Device and Server

As described above, it is often necessary to store the tiles of a map on a server as the amount of storage on an electronic device (particularly a mobile device) is usually small. Thus, the map may be stored remotely, and the device can request the map for certain regions. As in FIG. 2A, the map can be segmented to form a 2D grid, and the graphics information (map tile) for each grid segment can be determined by the server. The device can then request the desired amp tiles. For 3D maps, the map tiles can provide information for view that part of the map from various angles and heights, although other map tiles may be used for various levels of resolution.

The device and server can store the same grid, and thus be synchronized. When the device moves the virtual camera to change the viewable area of the map, the indices for the tiles of the new viewing area can be communicated to the server, and the tiles can be retrieved. The size of the grid and of the tiles can be any value, as long as the device and the server both store the same grid and thus have the same index of the tiles. The device can then determine which tiles are being viewed based on a position of the virtual camera and then request the correct tiles. This process can encounter problems when the map is a raised-relief map, which will be described later. Aspects of the device and server are now described. The description below can apply to relief maps (2D) and to raised-relief maps (3D).

FIG. 3A is a simplified block diagram of an implementation of a device 300 according to an embodiment of the present invention. Device 300 can be a mobile device, a handheld device, a notebook computer, a desktop computer, or any suitable electronic device with a screen for displaying images and that is capable of communicating with a map server 350 as described herein. Device 300 includes a processing subsystem 302, a storage subsystem 304, a user input device 306, a user output device 308, a network interface 310, and a location/motion detector 312.

Processing subsystem 302, which can be implemented as one or more integrated circuits (e.g., e.g., one or more single-core or multi-core microprocessors or microcontrollers), can control the operation of device 300. In various embodiments, processing subsystem 302 can execute a variety of programs in response to program code and can maintain multiple concurrently executing programs or processes. At any given time, some or all of the program code to be executed can be resident in processing subsystem 302 and/or in storage subsystem 304.

Through suitable programming, processing subsystem 302 can provide various functionality for device 300. For example, processing subsystem 302 can execute a map visualization application program (or "app") 316. Map visualization app 316 can identify one or more regions in a potential viewing area of a map, and retrieve an estimated height of the regions from estimated height store 318 of storage 304. Map visualization app 316 can use the estimated height of the regions to determine which tiles are viewable, and then use access an index of tile location 317 to identify the specific tiles, which can be communicated to map server 350. Map visualization app 316 can perform various embodiments described herein.

Device 300 can have the values in estimated height store 318 at the time of shipping to a user. As other examples, the device could be initialized to have the estimated height values when the device is initialized for use, e.g., when a phone is first connected to a network. The estimated height value also do not need to be for every part of a map. Instead, the height values could be pushed to the device for a selected part of the map (e.g., where the state or country where the device is shipped or resides during initialization). If the device travels to a new area (likely a large distance away), then some new estimated heights could be sent. The estimated heights could also have a higher resolution (density) for where the user lives (and just a lower resolution for the estimated heights elsewhere), e.g., smaller regions to obtain the higher resolution. In another embodiment, device 300 could request the estimated heights at a time of viewing a map, which would be a relatively minimal amount of data, but such a request would still take a round trip over the network. Thus, some sort of storage before use would be more efficient.

Storage subsystem 304 can be implemented, e.g., using disk, flash memory, or any other storage media in any combination, and can include volatile and/or non-volatile storage as desired. In some embodiments, storage subsystem 304 can store one or more application programs to be executed by processing subsystem 302 (e.g., map visualization app 316). In some embodiments, storage subsystem 304 can store other data (e.g., used by and/or defined by map visualization app 316), such as an index of a 2D surface that defines locations of the map tiles and the estimated heights of various regions of the map. Programs and/or data can be stored in non-volatile storage and copied in whole or in part to volatile working memory during program execution.

A user interface can be provided by one or more user input devices 306 and one or more user output devices 308. User input devices 306 can include a touch pad, touch screen, scroll wheel, click wheel, dial, button, switch, keypad, microphone, or the like. User output devices 308 can include a video screen, indicator lights, speakers, headphone jacks, or the like, together with supporting electronics (e.g., digital-to-analog or analog-to-digital converters, signal processors, or the like). A customer can operate input devices 306 to invoke the functionality of device 300 and can view and/or hear output from device 300 via output devices 308.

Network interface 310 can provide voice and/or data communication capability for device 300. For example, network interface 310 can provide device 300 with the capability of communicating with map server 350. In some embodiments network interface 310 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 310 can provide wired network connectivity (e.g., Ethernet) in addition to or instead of a wireless interface. Network interface 310 can be implemented using a combination of hardware (e.g., antennas, modulators/demodulators, encoders/decoders, and other analog and/or digital signal processing circuits) and software components.

Location/motion detector 312 can detect a past, current or future location of device 300 and/or a past, current or future motion of device 300. For example, location/motion detector 312 can detect a velocity or acceleration of mobile electronic device 300. Location/motion detector 312 can comprise a Global Positioning Satellite (GPS) receiver and/or an accelerometer. In some instances, processing subsystem 302 determines a motion characteristic of device 300 (e.g., velocity) based on data collected by location/motion detector 312. For example, a velocity can be estimated by determining a distance between two detected locations and dividing the distance by a time difference between the detections.

FIG. 3B is a simplified block diagram of an implementation of map server 350 according to an embodiment of the present invention. Map server 350 may be used for any map server mentioned herein. Map server 350 includes a processing subsystem 352, storage subsystem 354, a user input device 356, a user output device 358, and a network interface 360. Network interface 360 can have similar or identical features as network interface 310 of device 300 described above.

Processing subsystem 352, which can be implemented as one or more integrated circuits (e.g., a conventional microprocessor or microcontroller), can control the operation of map server 350. In various embodiments, processing subsystem 352 can execute a variety of programs in response to program code and can maintain multiple concurrently executing programs or processes. At any given time, some or all of the program code to be executed can be resident in processing subsystem 352 and/or in storage subsystem 354.

Through suitable programming, processing subsystem 352 can provide various functionality for map server 350. Thus, map server 350 can interact with map visualization app 316 being executed on device 300 in order to provide map tiles to device 300. In one embodiment, map server 350 simply stores the map tiles 366, and sends them based on a request for a particular index, as identified by tile index 368. The map tiles can be stored in a location pointed to by the tile index 358 for quick retrieval. In other embodiments, map server 350 can determine additional tiles to be sent based on an initial request, e.g., the indices of tiles initially requested. However, such processing can become more difficult if map sever 350 supports many devices. In another implementation, map server 350 server can also store estimates of heights within various regions, and send those to device 300, which can use the estimated heights to determine the map tiles needed.

Storage subsystem 354 can be implemented, e.g., using disk, flash memory, or any other storage media in any combination, and can include volatile and/or non-volatile storage as desired. In some embodiments, storage subsystem 354 can store one or more application programs to be executed by processing subsystem 352. In some embodiments, storage subsystem 354 can store other data, such as map tiles 366 and tile index 368 (used to identify specific tiles). Programs and/or data can be stored in non-volatile storage and copied in whole or in part to volatile working memory during program execution.

A user interface can be provided by one or more user input devices 356 and one or more user output devices 358. User input and output devices 356 and 358 can be similar or identical to user input and output devices 306 and 308 of device 300 described above. In some instances, user input and output devices 356 and 358 are configured to allow a programmer to interact with map server 350. In some instances, map server 350 can be implemented at a server farm, and the user interface need not be local to the servers.

It will be appreciated that device 300 and map server 350 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 300 and/or multiple map servers 350, different devices 300 and/or map servers 350 can have different sets of capabilities; the various devices 300 and/or map servers 350 can be but need not be similar or identical to each other.

Further, while device 300 and map server 350 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 300 and map server 350 are described as singular entities, it is to be understood that each can include multiple coupled entities. For example, map server 350 can include, a server, a set of coupled servers, a computer and/or a set of coupled computers.

III. Raised Relief Map

Section I described viewing a 2D map and identifying the map tiles to be retrieved from a server based on a particular part of the 2D map being viewed. While 2D maps are useful for some purposes, a 3D map can provide additional benefits. With 3D maps, it is advantageous for the user to change the angle of the view of the map, as well as the height of the virtual camera.

Figure 4:
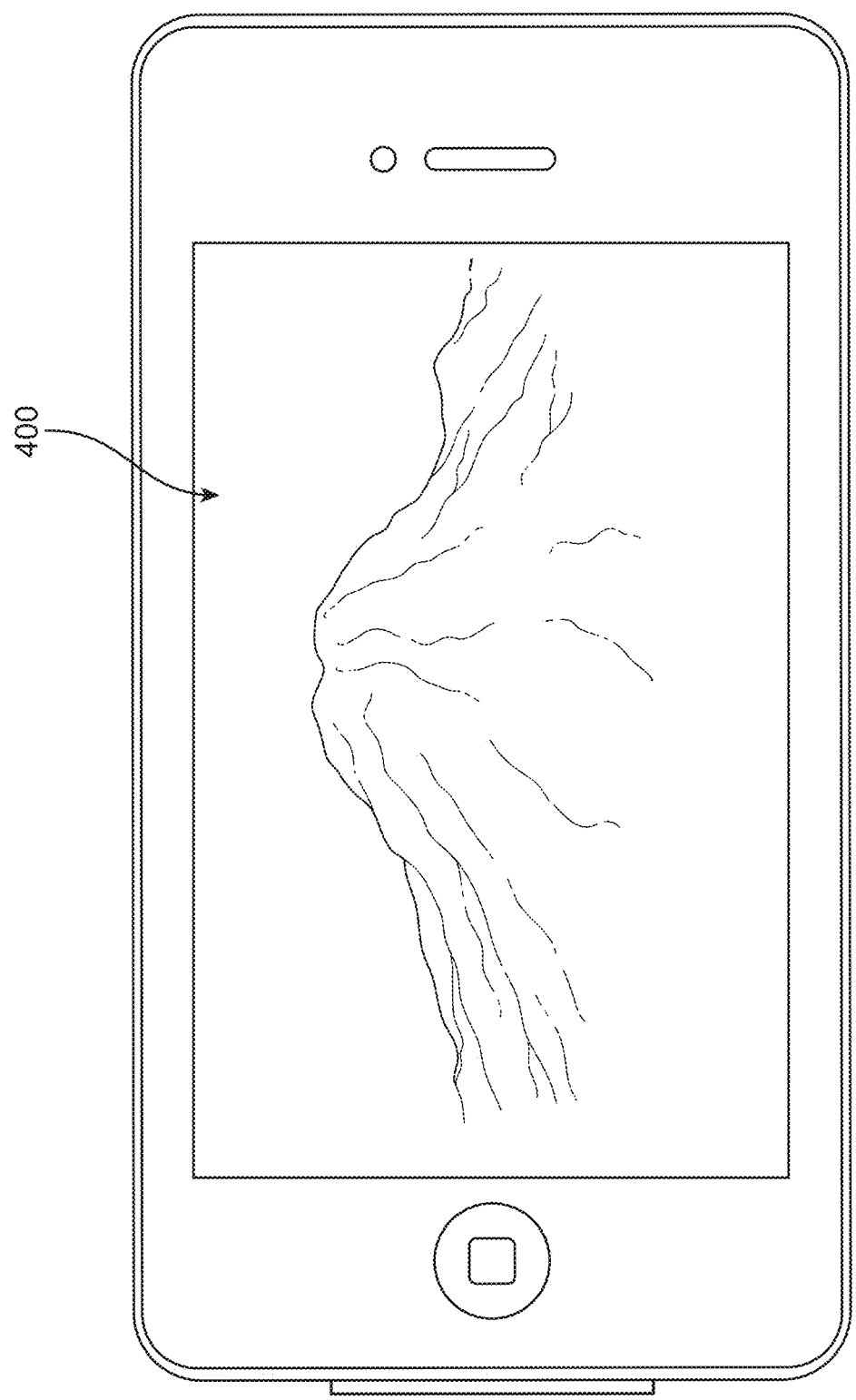
FIG. 4 shows a perspective view 400 of a 3D map of a mountain or hill.

FIG. 4 shows a perspective view 400 of a 3D map of a mountain or hill. The virtual camera is angled so that the view is not from directly above the mountain but instead looking toward the mountain from above. Therefore, one can see a front face of the mountain, but not the back side. The view 400 can be assembled from a plurality of map tiles that are retrieved from a server, e.g., map server 140.

Embodiments can define such a 3D map using a grid on a 2D surface. The 2D surface can be defined as being at a particular height. Then, for each grid section (e.g., an indexed polygon), the 3D map can have a map tile that defines a height at various points within that grid section. For example, the map tile can define the local coordinates within the grid section, and store a height value for each point within the local coordinate system of the grid section. Other information like color and shading (as well as any other suitable graphics information) can also be stored in the map tiles. The indexed array of tiles can be non-uniform, e.g., with more tiles at areas of greater height variation.

Figure 5:
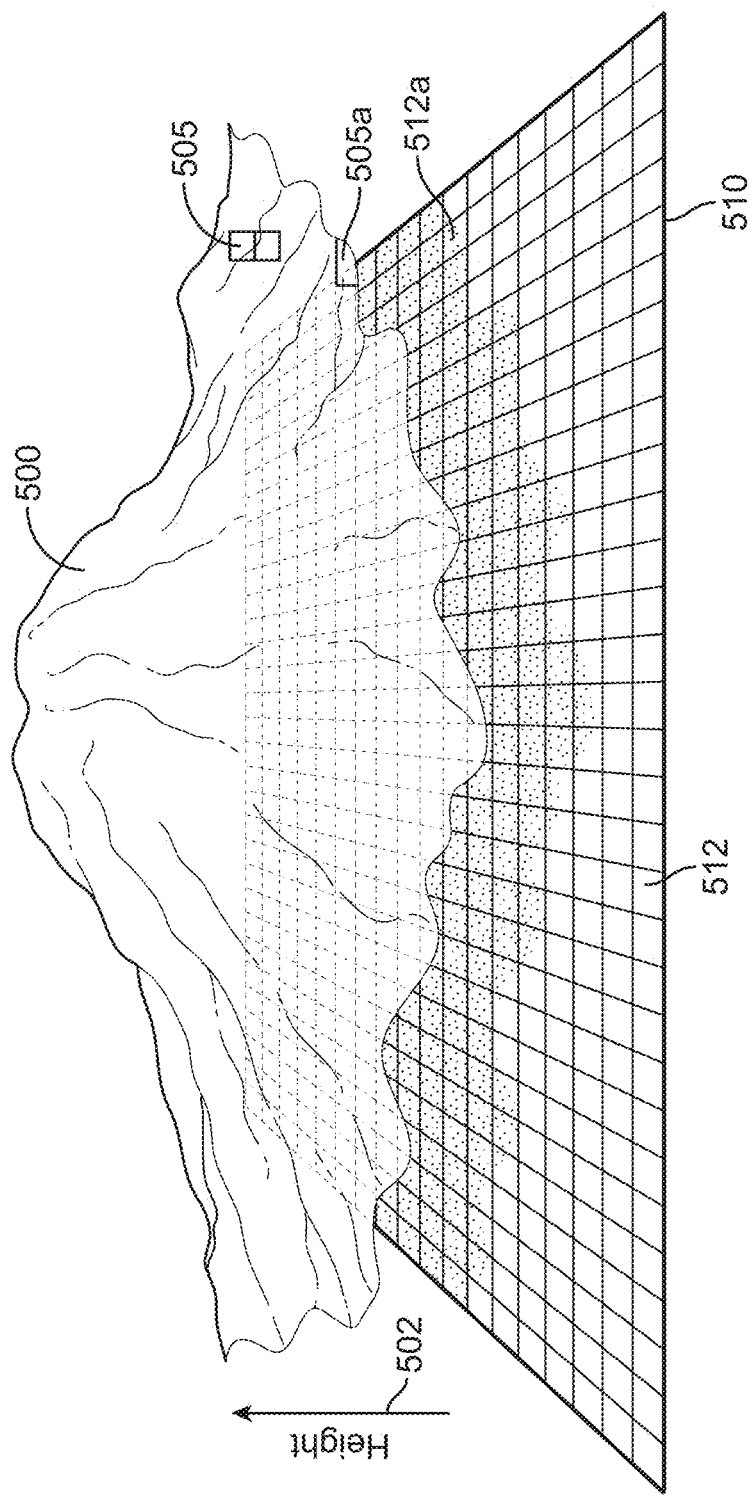
FIG. 5 shows a raised-relief map 500 positioned on a 2D surface 510 according to embodiments of the present invention.

FIG. 5 shows a raised-relief map 500 positioned on a 2D surface 510 according to embodiments of the present invention. Raised-relief map 500 is a 3D map, with 2D surface 510 corresponding to two dimensions of the map 500. The third dimension is height 502, which is defined relative to 2D surface 510. The part of the 2D surface not visible is shown with dotted lines. Only part of relief-map 500 is shown, and only part of 2D surface 510 is shown. The base of the mountain shown is at a certain distance above the 2D surface. Thus, the base of the mountain would have a positive height, if the 2D surface had a height of zero.

As shown, 2D surface 510 is separated into a grid, as is described herein, which can be used to identify different parts of map 500. Each grid section (tile) 512 is associated with a particular part of the map, specifically the part above the respective tile. For example, grid section (tile) 512a is associated with map tile 505a, and can be associated with a particular index value. Thus, when the corresponding index value is provided, map tile 505a can be retrieved. Map tile 505a can be a cube or other volumetric shape.

Grid sections 512 can be used to determine which map tiles 505 are needed to display the view of map 500 for a given position of a virtual camera. The intersection of the field of view of the camera with the map 500 can be found, and the underlying grid section identified. The indexes for these grid section can be provided to a server to retrieve desired map tiles. The problem is that the device does not store map 500. The device does not know a priori the height of the part of the raised-relief map that is being viewed, and thus the intersection is unknown. But, the device could identify the intersection of the virtual camera with the 2D surface to determine possible tiles that are needed, but such a technique has the following problem.

Figure 6:
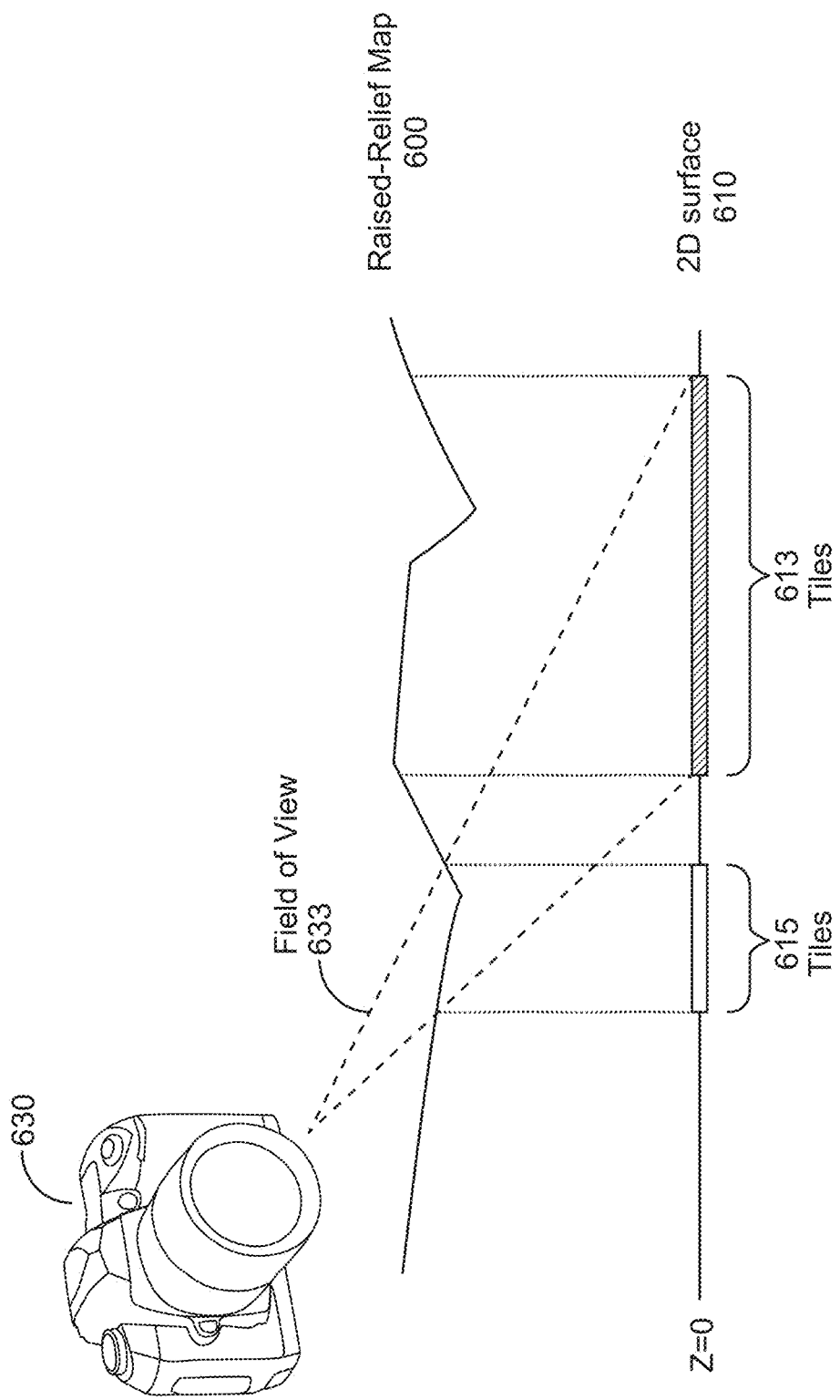
FIG. 6 shows a problem with determining the proper map tiles to be retrieved from a map server.

FIG. 6 shows a problem with determining the proper map tiles to be retrieved from a map server. FIG. 6 shows a cross-sectional view of a raised-relief map 600 positioned on a 2D surface 610. The horizontal axis is the X axis and lies along 2D surface 610, and the vertical axis is the Z axis (the axes do not have to be orthogonal, but typically would be). Raised-relief map 600 may correspond to natural (e.g. rolling hills or a plateau) or man-made structures. The underlying 2D surface 610, which corresponds to the coordinate system of map 600 is shown at height Z=0 beneath map 600 (the height value for the 2D surface is arbitrary, and thus Z=0 is a convenient value, but other values can be used). Thus, at least for the section shown, map 600 is at heights above Z=0. 2D surface 610 can use any coordinate system. For example, the 2D surface can be the surface of a sphere, with the coordinate system use polar coordinates, such as latitude and longitude.

A virtual camera 630 is shown at a position (height and angular orientation) above map 600. As explained above, the position of the virtual camera is used to determine the displayed image of the selected view. A field of view 633 (also called a view volume) is shown from camera 630 to the 2D surface 610, using dotted lines signifying two rays defining edges of the field of view. As shown, the field of view 633 intersects 2D surface at tiles 613, e.g., by defining a frustum with view volume corresponding to the field of view 633. The view volume is effectively projected onto the Z=0 plane to produce a footprint of tiles 613. However, the field of view intersects map 600 at tiles 615. The tiles 615 and 613 can include any number of tiles and would include tiles in the Y direction (into the sheet) as well. Here, tiles 615 on 2D surface 610 have corresponding map tiles, which include height information for the section of map 600 that is above tiles 615. Thus, tiles 613 effectively refer to these corresponding map tiles.

As can be seen, tiles 613 do not overlap with tiles 615. Thus, if a device uses the intersection of field of view 633 with 2D surface 610, the map tiles retrieved from map server would be wrong. For example, if the device identified the indices of tiles 613, the device would not be able to display the viewable parts of map 600 given the current position of the virtual camera. That is, the map tiles corresponding to tiles 613 are not actually viewable from the current position of the virtual camera. Thus these map tiles be discarded, or could be drawn by the device, but they would be off screen. This problem becomes more acute when the virtual camera is at an angle, although it does exist with the view is straight down, e.g., as in FIGS. 2B and 2C.

A device could retrieve tiles within a perimeter around tiles 613, which would encompass tiles 615, but such a technique is wasteful and inefficient, as described herein. After retrieving the map information for tiles 613, the device could request map tiles for sections closer to camera 630, but this would require multiple requests. Therefore it would be beneficial to determine the proper map tiles with the first request from the server, with the request being for a relatively limited amount of tiles (e.g. only the tiles needed, or just a few more). A solution is to have an estimated height for different regions of the raised-relief map, and use the estimated heights to determine the map tiles to request.

IV. Estimated Heights of Regions

Instead of finding out height information by requesting map tiles from the map server, embodiments have an estimated height for various regions of the map already stored. These estimated heights may be pre-loaded when the device (e.g. a phone) is shipped or initialized. A region for which an estimated height is stored could be smaller, equal to, or larger than a tile of the corresponding 2D surface. The resolution of the estimated heights would be less than the actual map, thus it is on a coarser grid than the height information of the map. Note the map has height information on a smaller grid than is used to define the tiles.

Figure 7:
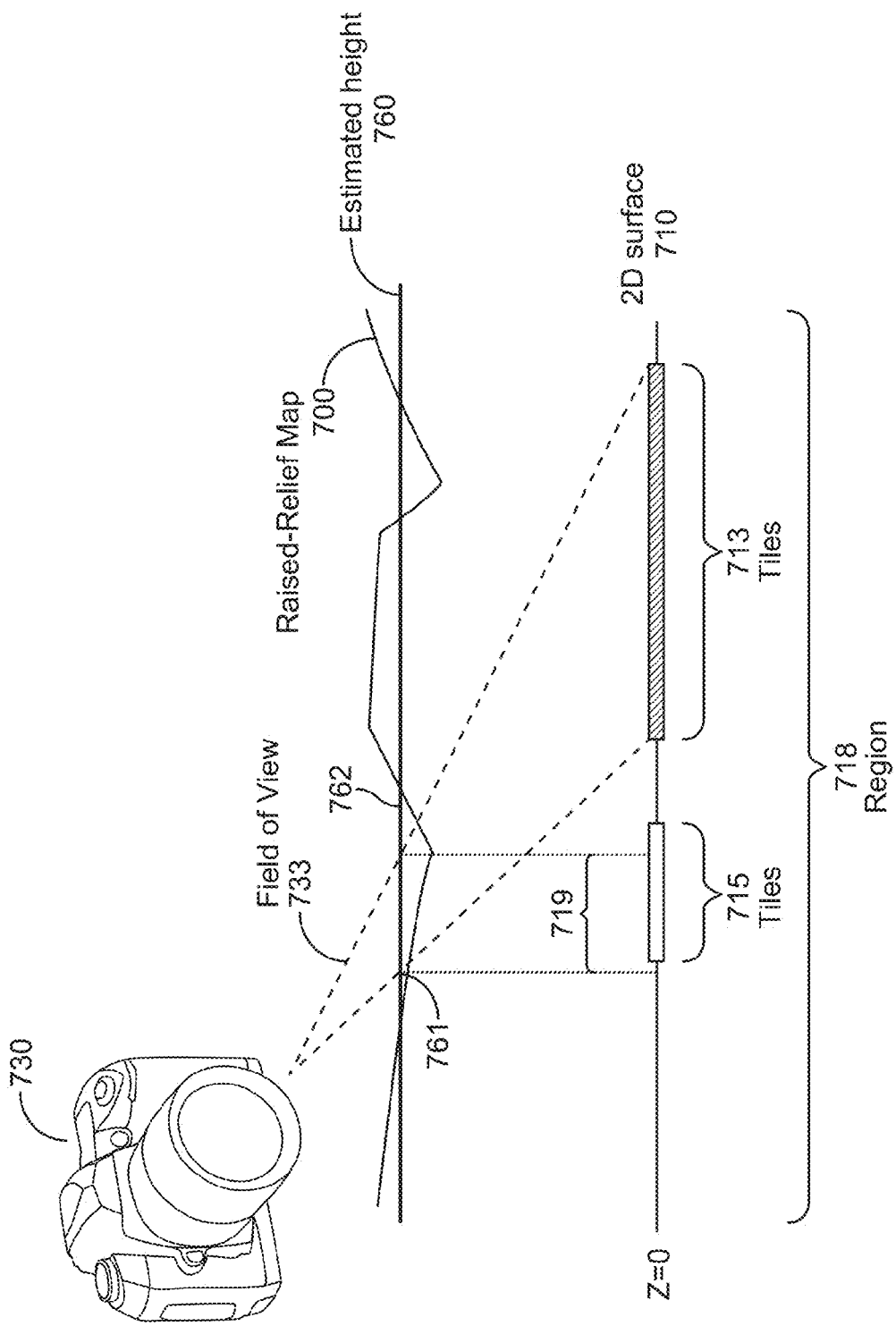
FIG. 7 shows an example of determining map tiles to retrieve from a map server according to embodiments of the present invention.

FIG. 7 shows an example of determining map tiles to retrieve from a map server according to embodiments of the present invention. An estimated height 760 for a region of map 700 is used to determine the map tiles to retrieve from the map server. As shown, estimated height 760 is a flat horizontal line indicating a constant height over a region that is larger than the grid section on 2D surface 710, since multiple tiles are within the region of constant estimated height. This estimated height allows the device (e.g., device 100 or 200) to determine the map tiles that are likely to be needed to render the view of raised-relief map 700, as selected by the position of virtual camera 730.

The device can receive a position of virtual camera 730. At first, the position can just include the location on the 2D surface, i.e., the X,Y coordinates of virtual camera 730. As mentioned herein, the device can identify these coordinates in various ways. For example, a user can search for a location (e.g. by entering the search term "Denver") and the device can store the location of Denver on the surface (e.g., using X,Y coordinates of a grid). The location could be an area (i.e. more than a single point location), and 730 virtual camera can be placed at a default position relative to the area corresponding to the search term. Other examples of determining the area and location of the virtual camera are using GPS and having the user navigate to the area (e.g., using a touch screen).

One the X,Y location of virtual camera 730 is determined, the device can retrieve estimated height 760, which can be stored in memory (e.g., as indicated by storage location 318 of storage 304). In another embodiment, estimated height 760 could be retrieved from the map server, where the amount of data transmitted is minimal since estimated height 760 can be just a single value. With the estimated height 760 of region 718 (which is within the general area of virtual camera 730), a field of view 733 can be used to determine the tile to retrieve. Although region 718 is shown encompassing field of view 733, the field of view could cover more than one region and the intersection could include more than one region. Field of view 733 depends on an orientation of virtual camera 730, and may be defined by the spherical angles, e.g., the angle relative to the Z-axis and the X-axis.

As shown, field of view 733 intersects estimated height 760 at points 761 and 762, which lie in the region 718 where the edge rays of field of view 733 cross the estimated height 760. Note that two different edge rays could intersect with different estimated heights of two different regions, depending on how large the regions are the how wide the field of view is. The 2D coordinates of points 761 and 762 can be found by projecting down onto 2D surface 710. Note that the device can identify other points of intersection in the Y direction as part of identifying a polygon or other shape of intersection of field of view 733 on the 2D surface 710.

As one can see, an estimated set of tiles 719 is close to the needed set of tiles 715, and is much better than tiles 713, which correspond to the intersection with 2D surface 710. In this case, the set of map tiles 719 overlaps with tiles 715 (cf. tiles 615 of FIG. 615) that correspond to the intersection of field of view 733 with map 700. If the device retrieved only map tiles 719, then a few more additional tiles would need to be retrieved to obtain the needed tiles 715, since tiles 715 are not a subset of tiles 719. This can be addressed by retrieving automatically retrieving additional tiles, e.g., as is described below.

In this example, tiles 715 are not a subset of tiles 719, e.g., due to the actual variation in height of map 700. To account for this possibility (note the device does not have map 700 yet), the device could expand the intersection area (e.g., an ellipse), as shown by points 761 and 762 in this cross-sectional view, to retrieve a larger set of tiles than tiles 719 (e.g., 10 or 20% more). With a slightly larger set of tiles than the intersection with estimated height 760, it is more likely that the needed tiles will be retrieved with the first request. However, the extra amount of tiles would typically be limited as otherwise the cost of retrieval from the map server would be too expensive.

A benefit of using estimated height 760, as opposed to just using a position relative to the 2D surface, can be most pronounced when the height of map 700 is large. For example, for Denver the height becomes more important, since it a mile above sea level. In other words, the greater the deviation of map 700 from 2D surface 710, the larger the error is using the intersection with 2D surface 710, and the greater the benefit of using estimated height 760.

The estimated height could be an average or median height for the region of the map, which could thus be the average height for a tile. The estimated heights can be calculated by a computer system that stores the map. In one embodiment, each region has a constant estimated height, which can result in discontinuities between neighboring regions. In other embodiments, the discontinuities could be smoothed in a variety of ways, e.g., by determining a slope that changes the height between the two constant values, with the slope having some predetermined value. Other model functions (besides a linear) could be used to make the change from one region to another sloped so that the change is continuous.

The estimated height does not have to be constants within a region. A simple model could be used to determine the estimated height within a region, e.g., to address discontinuities as mentioned above. Such a technique still uses the estimated value and could quickly determine which tiles are needed. But, overall such a technique may not provide much advantage since the tiles at the boundary of the regions may be requested anyway, such as when the intersection area is expanded (e.g., by a fixed percentage) to account for unknown variations in the map.

In one embodiment, the estimated height from several regions can be used to determine an average height for an entire area associated with the position of the virtual camera. In this manner, there would be just one estimated height value used to determine the intersection with the field of view. For example, ten regions might be identified as being within a selected area. An average of these ten regions could then be assigned to the area, and this one average height could be used to determine the required map tiles.

The estimated height of the regions can be defined by point values, which could be placed in a non-uniform manner. For example, larger changes in height might have more grid values. This grid would be more coarse than the height positions of the map tiles being requested. The estimated heights at the grid locations can be averaged or a basic model (e.g. interpolation) could be used to gain a rough approximation of the map. The interpolation could be stored or generated dynamically. The regions from such a grid could effectively be defined where the points are (e.g., each region can be a polygon with one point contained within it, and the polygon can be determine from the median between the grid points. Cubic splines, Fourier, or other model functions can be used for determining the estimated heights, e.g., where the data stored at the device are coefficients of a set of functions, and then a height can be determined by entering an area into the function to obtain the heights within the area.

Besides an estimated height, a value for the deviation from the height may be used. Such a value might help in determining how many additional tiles to obtain in addition to those within the intersection of the field of view with the estimated height. For example, if the standard deviation (or other statistical value) of the height is quite large, then more tiles might be selected than if it was known that the deviation was extremely small, e.g., where the height is or at least almost constant (in that case only the exact tiles might be selected). As another example, a large change in height might occur. If such a change was large enough, then such a region might get flagged as being problematic, and thereby needing more tiles outside of the intersection. The value could be any classification signifying a level of maximum change in the region. More than one value could be used, and these values could be fed into a function that provides a single output value. The output value could be a grade or category that is pre-computed by the device or server that conveys how far away tiles should be retrieved from the tiles that are within the specific intersection.

V. Using Estimated Height to Identify Map Tiles

As described above, embodiments can be used view any type of raised-relief map, and not just one of the real word. A map of fantasy worlds (e.g. a virtual gaming environment) can also be viewed, where the full map is stored on a server. A virtual camera can be used to obtain various view of the map, with the relative geometry of the map and the camera being rearranged based on user input. The 2D surface on which the map is laid can have various arrangements, e.g., the 2D surface could vertical with the camera aimed at the wall in a horizontal direction. Thus, the term "height" is used generally to be in any direction out of the 2D surface used for the coordinate system of the map.

Figure 8:
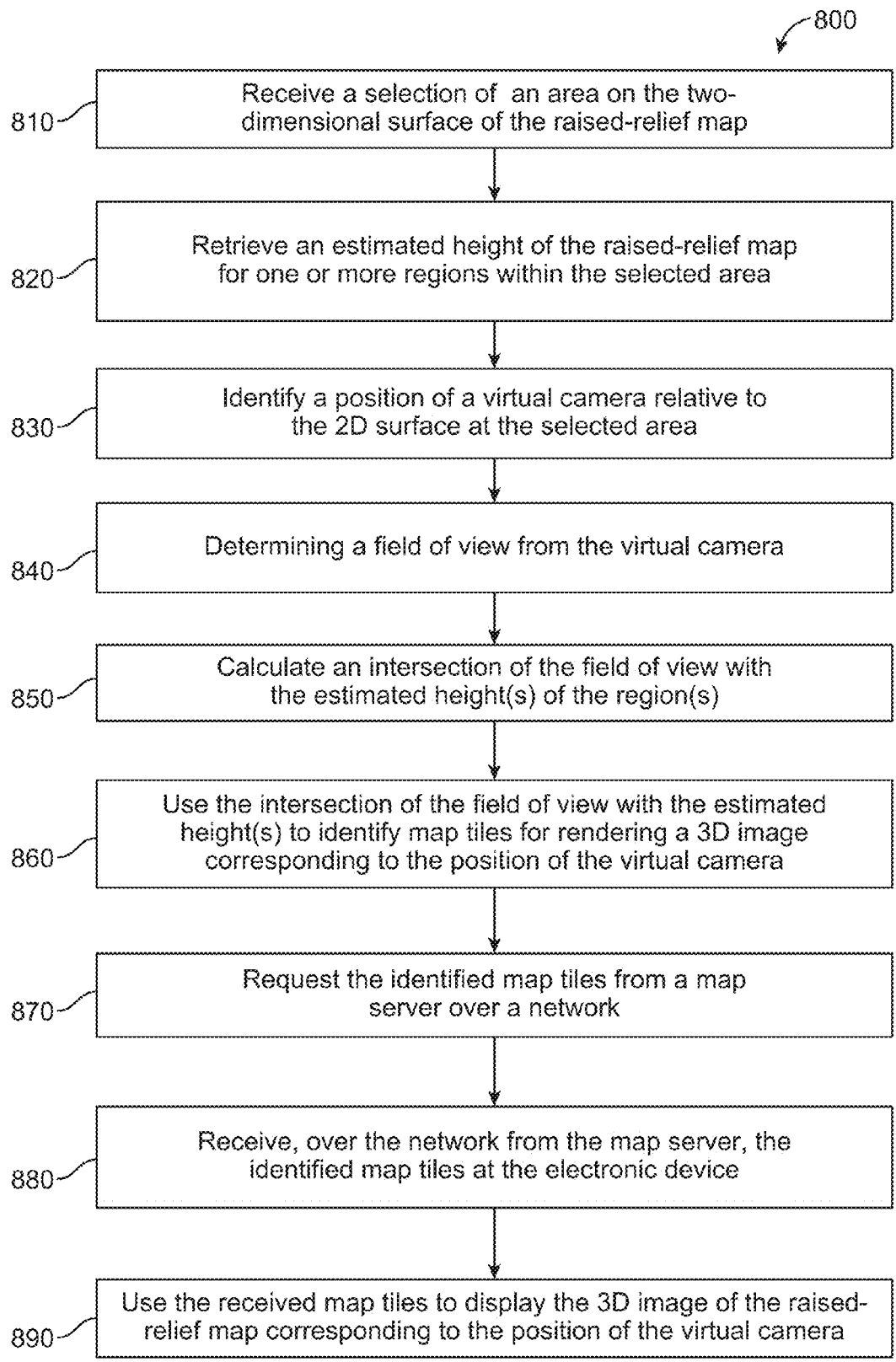
FIG. 8 is a flowchart of a method 800 for displaying three-dimensional (3D) views of a raised-relief map positioned on a two-dimensional (2D) surface according to embodiments of the present invention.

FIG. 8 is a flowchart of a method 800 for displaying three-dimensional (3D) views of a raised-relief map positioned on a two-dimensional (2D) surface according to embodiments of the present invention. Method 800 may be implement by a device (e.g., devices 100 or 200) that wishes to retrieve a viewable part of a map from a map server (e.g., 140 or 350). The device obtains an estimated height for a region, and uses the estimated height to determine which map tiles of the map are likely to be needed for a given position of a virtual camera (the position from which the image is rendered). Method 800 may be implemented by map visualization app 316.

In step 810, an electronic device receives a selection of an area on the two-dimensional surface of the raised-relief map. A user of the device can make the selection by entering a search term or navigating the view (e.g., by moving a virtual camera) to an area of the map, GPS, or via other suitable techniques, some of which are described herein. The 2D surface comprises an indexed array of tiles. The indexed array can act as a coordinate system for the raised-relief map. For each tile, graphics information can be defined for the map, where the graphics information can include the variations in height of the map for the respective tile. This height information and any other graphics information can be stored as a map tile corresponding to the tile in the 2D surface.

In step 820, a map visualization app (e.g., 316 of FIG. 3A) can retrieve from a storage of the electronic device an estimated height of the raised-relief map for one or more regions within the selected area. The estimated height may be determined, as described herein. In one embodiment, the estimated height is in a direction perpendicular to the two-dimensional surface. In another embodiment, the height could be a direction that is not perpendicular, e.g., if a non-Euclidean coordinate system is used.

The one or more regions may be one region, which corresponds to the selected area. A region may include multiple tiles, where estimated height may be obtained for each tile or just one estimated height for a region that includes multiple tiles. The estimated heights can be on a different grid than the tiles of the 2D surface, e.g., a coarser grid or a non-uniform grid.

As described above, the estimated heights for various regions can be stored in the device before the device is shipped to a user, or downloaded when the device is initialized. In such embodiments, the one or more estimated heights are stored in memory before the area is selected. In another embodiment, the estimated height for a region may be retrieved from the map server once the area is selected. For example, the device could identify the tiles of the 2D surface that are within the selected area, and the map server can provide the estimated height(s) for the region(s) with the area. But, since the estimated height is smaller than the map tiles, such a method is still faster than retrieving the map tiles.

In step 830, a position of a virtual camera relative to the 2D surface at the selected area is identified. In various embodiments, the position may be set as a default for the selected area or via user controls, as is described herein. When the map is of the ground (including the ground of a fantasy world, e.g., in a video game), the position of the virtual camera can be configured to provide an aerial view of the raised-relief map at the selected area.

In step 840, a field of view of the virtual camera is determined. The field of view may be defined with a frustum (e.g., a cone) containing a view volume. Other shapes besides conical can be used to define the field of view that the virtual camera can see. The field of view can be along a central axis that has an angle (i.e. not normal to the surface; less than ninety degrees) relative to the 2D surface. In one aspect, the field of view can expand as the distance away from the virtual camera increases.

In step 850, a processor of the electronic device can calculate where the field of view intersects with the one or more estimated heights of the one or more regions within the selected area. The intersection can be any two-dimensional shape. The estimated height(s) of the one or more regions can be constructed as a 3D surface, which could be continuous or non-continuous. The surface can be determined using interpolation or a patchwork of functions defined only within a certain region (e.g., constant values providing steps on the surface). In one embodiment, the field of view can be defined using a formula, and a point or range where the field of view drop below the estimated height can be identified. The regions(s) of the selected area would typically be large enough that the field of view of the virtual camera would intersect the map within the area. If not, then estimated heights for additional regions can be retrieved.

In step 860, the intersection of the field of view with the one or more estimated heights is used to identify map tiles of the raised-relief map for rendering a 3D image of the raised-relief map corresponding to the position of the virtual camera. The location of the regions is known relative to the grid of the 2D surface, and thus the intersection with the estimated heights can be identified as occurring at particular X,Y coordinates on the 2D surface. For example, points 761 and 762 in FIG. 7 can be identified as occurring at particular X,Y coordinates of 2D surface 710. The tiles that are at least partially within the intersection area can be identified as being needed. As described herein, additional map tiles can be requested. Alternatively, an initial field of view could be defined to be larger (e.g., 10% larger) than the actual field of view, and the intersection of the initial field of view can be used. Since this initial field of view is larger, all of the tiles that intersect the actual field of view can be retrieved. The size of the initial field of view can be determined in a similar manner as for determining how many additional tiles should be retrieved.

In step 870, the identified map tiles are requested from the server over a network. The network may be wireless or wired. Examples are provided herein. In one embodiment, the network is limited relative to speeds for obtaining data from a hard drive of a standard computer system.

In step 880, electronic device receives the identified map tiles over the network from the server. The map tiles can be sent with tags (e.g., the index of the tile in the array) to identify where in the map a particular map tile belongs. An orientation of the map tile can also be specified. For example, for a square tile, the northernmost edge of the tile can be specified so that the image is consistent. In other embodiments, the device could determine the orientation from the other tiles (e.g., by determining which edges match).

In step 890, the received map tiles are used to display the 3D image of the raised-relief map corresponding to the position of the virtual camera. For example, the electronic device can have a graphics processor that uses the graphics information in the map tiles to render the particular view. The received map tiles can also be used to render views that are similar to the current position of the virtual camera, as long as new map tiles are not needed, and then part of the view could at least be displayed with the previously received map tiles.

The received map tiles can also be used to determine other map tiles to retrieve, e.g., if the initial map tiles do not cover the entire viewable are of the map. Although this may take extra time, the amount of extra tiles requested should be relatively small. In one embodiment, the device can use the map tiles to construct the raised-relief map, and then determine where the field of view intersects this more accurate version of the map. The more accurate version can also use the estimated heights in addition to the received map tiles. Thus, the device can analyze the received map tiles to identify parts of the map that can be seen, but whose map tiles were not retrieved in the initial request.

The device can refine the estimated heights over time. For example, if a tile is received and analyzed and found to have a significant variation, the device could mark the level of variations to determine the extended boundary to retrieve tiles, e.g., in a similar or same manner as described above. The regions with estimated heights could also become more refined, e.g., the estimated height for more and smaller regions could be stored, subject to a possible limit on memory. For example, if a user performs 90% of the searches for a particular area, then the downloaded tiles could be used to create estimated heights at a higher resolution than was initially stored (e.g., the regions could be twice as dense as originally obtained). If this area of common viewing is not very large, the additional memory would not be significant. The memory could be limited by purging old data, and thus reverting back to a lower resolution.

Map tiles are typically about 100 to 200 Kb. As one requests more detail of an image (e.g. a subtile), the new subtile would also be about 100-200 kb, but be for a smaller area. However, this obtaining of additional resolution does not determine which tiles are within the viewable area, but simply provides greater resolution within the area already determined to be within the viewing area.

Accordingly, one embodiment queries the server or local database that contains height information to estimate a median height value (an example of an estimated height) for a region, and the estimated heights could be loaded into an app. This estimated height information can be used as a proxy for the actual map. A view volume for a particular position of the virtual camera can be projected onto the proxy to produce a footprint (whose 2D coordinates can be determined relative to a 2D grid of map tiles). The footprint is then used to determine the map tiles to retrieve. For each viewable map tile (e.g., a 3D cube), the device can sub-divide the map tile into eight map tiles (or other number of map tiles) and continue recursively until the scene is fully rendered. The height information in the new map tiles heights can be used to update the proxy, and the new proxy can be used for future tile selections. The initial proxy may be a coarse terrain shipped with the map visualization app. Assuming ~64 MB size for storage on the device, device could store one float sample per 1.5 miles, which is about 3×4=12 samples for downtown San Francisco. The coarse terrain could be compressed and use importance sampling, placing more samples at cities and highly varying terrain.

To project the view volume onto the proxy, the 2D image plane (e.g., 2D surface 710) can be divided into a grid of samples (2D tiles). For each sample, a ray cast to the proxy can provide a 3D point (x,y,z) of intersection with the proxy. After ray casting through each grid sample, the device can obtain a sampling of the camera's footprint on the proxy. This footprint can then be projected onto the z=0 plane (e.g. drop the z value) to identify the map tiles to be retrieved. Referring to FIG. 7, observe that intersecting the dotted lines representing the view of view 733 with estimated height 760, then projecting down to Z=0 produces a footprint that's close to tiles 715, as is described above.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components.

The subsystems can be interconnected via a system bus. Additional subsystems can be a printer, keyboard, fixed disk, monitor, which can be coupled to display adapter. Peripherals and input/output (I/O) devices, which couple to an I/O controller, can be connected to the computer system by any number of means known in the art, such as serial port. For example, serial port or external interface (e.g. Ethernet, Wi-Fi, etc.) can be used to connect computer system to a wide area network such as the Internet, a mouse input device, or a scanner. The interconnection via the system bus can allow the central processor to communicate with each subsystem and to control the execution of instructions from system memory or the fixed disk, as well as the exchange of information between subsystems. The system memory and/or the fixed disk may embody a computer readable medium. Any of the values mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of displaying three-dimensional (3D) views of a raised-relief map positioned on a two-dimensional (2D) surface, the method comprising:
   receiving, at an electronic device, a selection of an area on the two-dimensional surface of the raised-relief map;
   retrieving, from a storage of the electronic device, a plurality of estimated elevations of the raised-relief map for one or more regions within the selected area;
   identifying a current position of a virtual camera relative to the 2D surface at the selected area, wherein identifying the current position includes determining a current height and a current orientation of the virtual camera relative to the 2D surface;
   determining, based on the current position, a field of view from the virtual camera;
   calculating, with a processor of the electronic device, an intersection of the field of view with one or more of the plurality of estimated elevations of the one or more regions within the selected area;
   using the intersection of the field of view with the one or more estimated elevations to identify map tiles of the raised-relief map for rendering a 3D image of the raised-relief map corresponding to the current position of the virtual camera;
   requesting the identified map tiles from a map server over a network;
   receiving, over the network from the map server, the identified map tiles at the electronic device; and
   using the received map tiles to display the 3D image of the raised-relief map corresponding to the current position of the virtual camera.

2. The method of claim 1, wherein the field of view intersects a first estimated elevation of a first region and a second estimated elevation of a second region.

3. The method of claim 1, wherein the plurality of estimated elevations are defined by a model function whose coefficients are stored in the storage of the electronic device.

4. The method of claim 1, wherein a central axis of the field of view forms an angle relative to the 2D surface, the angle being less than 90 degrees.

5. The method of claim 1, wherein the plurality of estimated elevations are in a direction perpendicular to the 2D surface.

6. The method of claim 1, wherein the 2D surface comprises an indexed array of tiles, and wherein requesting the identified map tiles from the map server includes sending an index for each identified map tile to the map server.

7. The method of claim 6, wherein at least one of the one or more regions is a same size as a tile of the indexed array of tiles.

8. The method of claim 1, wherein the plurality of estimated elevations are stored in the storage of the electronic device before the selection of the area is received.

9. The method of claim 1, further comprising:
   requesting additional map tiles based on the received map tiles.

10. The method of claim 1, further comprising:
    receiving the plurality of estimated elevations for a plurality of regions of the raised-relief map as part of an initialization of the electronic device; and
    storing the plurality of estimated elevations in the storage.

11. The method of claim 1, wherein the selection of the area is based on a location signal of the electronic device.

12. The method of claim 1, wherein the plurality of estimated elevations are stored as point values on a grid.

13. The method of claim 12, therein the grid is non-uniform.

14. The method of claim 1, wherein calculating the intersection of the field of view with the one or more estimated elevations of the one or more regions within the selected area includes:
    for each of a plurality of rays on an edge of the field of view:
       determining the two-dimensional coordinate of where the respective ray reaches an estimated elevation of a region that contains the two-dimensional coordinate.

15. An electronic device for displaying three-dimensional (3D) views of a raised-relief map positioned on a two-dimensional (2D) surface, the electronic device comprising:
    a storage subsystem that stores a plurality of estimated elevations, each for a plurality of regions of the raised-relief map;
    a network interface for communicating over a network with a map server that stores map tiles of the raised-relief map; and
    a processing subsystem configured to execute a map visualization application by:
       receiving a selection of an area on the two-dimensional surface of the raised-relief map;
       retrieving, from the storage subsystem, an estimated height of the raised-relief map for one or more regions within the selected area;
       identifying a current position of a virtual camera relative to the 2D surface at the selected area, wherein identifying the current position includes determining a current height and a current orientation of the virtual camera relative to the 2D surface;

determining, based on the current position, a field of view from the virtual camera;

calculating an intersection of the field of view with one or more of the plurality of estimated elevations of the one or more regions within the selected area;

using the intersection of the field of view with the one or more estimated elevations to identify map tiles of the raised-relief map for rendering a 3D image of the raised-relief map corresponding to the position of the virtual camera;

requesting the identified map tiles from the map server using the network interface;

receiving, via the network interface, the identified map tiles at the electronic device; and using the received map tiles to display the 3D image of the raised-relief map corresponding to the current position of the virtual camera.

16. The electronic device of claim 15, wherein the electronic device is a mobile device.

17. The electronic device of claim 15, further comprising:
a location detector configured to identify a location of the electronic device, where the processing subsystem receives the selection of the area on the two-dimensional surface of the raised-relief map as a location signal from the location detector.

18. The electronic device of claim 15, wherein the storage subsystem stores an index for each of an array of tiles on the 2D surface, wherein the processing subsystem is configured to send an index for each identified map tile to the map server.

19. The electronic device of claim 18, wherein at least one of the one or more regions is a same size as a tile of the indexed array of tiles.

20. The electronic device of claim 15, wherein the processing subsystem is configured to retrieve the plurality of estimated elevations from a server as part of an initialization of the electronic device.

21. The electronic device of claim 20, wherein the processing subsystem is configured to retrieve estimated elevations at a higher density for regions associated with where the electronic device is located.

22. A computer product comprising a non-transitory computer readable medium storing a plurality of instructions that when executed control a processor of an electronic device to display three-dimensional (3D) views of a raised-relief map positioned on a two-dimensional (2D) surface, the instructions comprising instructions for:

receiving a selection of an area on the two-dimensional surface of the raised-relief map;

retrieving, from a storage of the electronic device, a plurality of estimated elevations of the raised-relief map for one or more regions within the selected area;

identifying a current position of a virtual camera relative to the 2D surface at the selected area, wherein identifying the current position includes determining a current height and a current orientation of the virtual camera relative to the 2D surface;

determining, based on the current position, a field of view from the virtual camera;

calculating an intersection of the field of view with one or more of the plurality of estimated elevations of the one or more regions within the selected area;

using the intersection of the field of the one or more estimated elevations to identify map tiles of the raised-relief map for rendering a 3D image of the raised-relief map corresponding to the position of the virtual camera;

requesting the identified map tiles from a map server over a network;

receiving, over the network from the map server, the identified map tiles at the electronic device; and using the received map tiles to display the 3D image of the raised-relief map corresponding to the current position of the virtual camera.

* * * * *